(12) United States Patent
Ritter et al.

(10) Patent No.: US 8,973,342 B2
(45) Date of Patent: Mar. 10, 2015

(54) LOAD CONTROL SYSTEM AND METHOD FOR AN AGRICULTURAL HARVESTER

(71) Applicant: Deere & Company, Moline, IL (US)

(72) Inventors: Aaron S Ritter, Milan, IL (US); John A Schraeder, Geneseo, IL (US); Bruce A Coers, Hillsdale, IL (US)

(73) Assignee: Deere & Company, Moline, IL (US)

( * ) Notice: Subject to any disclaimer, the term of this patent is extended or adjusted under 35 U.S.C. 154(b) by 130 days.

(21) Appl. No.: 13/790,651

(22) Filed: Mar. 8, 2013

(65) Prior Publication Data
US 2014/0250849 A1 Sep. 11, 2014

(51) Int. Cl.
*A01D 41/14* (2006.01)
*A01D 75/18* (2006.01)

(52) U.S. Cl.
CPC ............ *A01D 75/182* (2013.01); *A01D 41/141* (2013.01); *A01D 41/145* (2013.01)
USPC .......................................... 56/10.2 R; 460/6

(58) Field of Classification Search
USPC ............ 56/10.2 R, 10.2 A–10.2 J, 10.8, 11.1, 56/16.4–16.8; 460/1, 6, 4, 7, 2, 103, 116, 460/150; 701/50; 364/424.01, 424.07, 148, 364/150, 151
See application file for complete search history.

(56) References Cited

U.S. PATENT DOCUMENTS

| | | | | |
|---|---|---|---|---|
| 6,036,597 A | * | 3/2000 | Arner | 460/6 |
| 6,213,870 B1 | * | 4/2001 | Satzler | 460/6 |
| 6,951,514 B1 | * | 10/2005 | Coers et al. | 460/1 |
| 7,062,368 B2 | * | 6/2006 | Ho et al. | 701/50 |
| 7,452,267 B2 | * | 11/2008 | Bundy et al. | 460/6 |

* cited by examiner

*Primary Examiner* — Robert Pezzuto

(57) ABSTRACT

A system and method for controlling a load on an agricultural harvester (100) comprising a first sensor (124, 126, 128, 130) to sense a first load, a second sensor (132, 134, 136, 138) to sense a second load, an electronic control unit (200) coupled to the first sensor and the second sensor, the electronic control unit (200) being configured to determine a difference between the first load and the second load, and to either (a) raise a harvesting head (102) or (b) stop the agricultural harvester (100), or (c) both, when the difference exceeds a threshold load.

14 Claims, 4 Drawing Sheets

LOAD CONTROL SYSTEM AND METHOD FOR AN AGRICULTURAL HARVESTER

FIELD

The invention relates to agricultural harvesters. More particularly, it relates to load control systems and methods for agricultural harvesters.

BACKGROUND

Harvesting heads or "headers" are elongate, laterally extending devices. They are suspended from a structure called a feederhouse that extends from the front of agricultural combines. They sever the crop plants and carry the severed crop plants to an open front end of the feederhouse. The feederhouse carries the cut crop material rearward and into the agricultural combine itself. The agricultural combine then threshes the cut crop material, separating the grain from the other plant matter, and saves the grain in a grain reservoir or grain tank on the agricultural combine.

Harvesting heads travel at relatively high speeds and very close to the ground. As a result they are prone to collide with the ground. The larger and wider they are, the greater the risk of damage to the harvesting head when collisions occur.

What is needed, therefore, is a system for controlling or limiting loads due to these ground collisions. It is an object of this invention to provide such a system.

SUMMARY

In accordance with a first aspect of the invention, a system for controlling the load on an agricultural harvester is provided, the system comprising a first load sensor disposed to sense a first load applied to the agricultural harvester; a second load sensor disposed to sense a second load applied to the agricultural harvester, an electronic control unit coupled to the first load sensor and the second load sensor, wherein the electronic control unit is configured to (a) read a first load signal from the first load sensor, (b) read a second load signal from the second load sensor, (c) determine whether a difference of the first load and the second load exceeds a threshold load, and (d) if the difference exceeds the threshold load, to either (i) lift a harvesting head, or (ii) stop over-the-ground travel of the agricultural harvester.

The agricultural harvester may further comprise a self-propelled agricultural harvesting vehicle and a feederhouse pivotally coupled to the front of the self-propelled agricultural harvesting vehicle at a first pivot and a second pivot.

The first load sensor may be disposed adjacent to the first pivot, and the second load sensor may be disposed adjacent to the second pivot.

The agricultural harvester may further comprise a frame pivotally coupled to the front of the feederhouse at a third pivot and a fourth pivot, and the frame may be configured to support the harvesting head.

The first load sensor may be disposed adjacent to the third pivot and the second load sensor may be disposed adjacent to the fourth pivot.

The agricultural harvester may further comprise a first feederhouse lift cylinder and a second feederhouse lift cylinder. The first feederhouse lift cylinder and the second feederhouse lift cylinder may be configured to move a forward end of the feederhouse vertically. A rear end of the first feederhouse lift cylinder may be coupled to the self-propelled agricultural harvesting vehicle at a third pivot. A rear end of the second feederhouse lift cylinder may be coupled to the self-propelled agricultural harvesting vehicle at a fourth pivot.

The first load sensor may be disposed adjacent to the third pivot. The second load sensor may be disposed adjacent to the fourth pivot.

The first load sensor may be disposed adjacent to a front end of the first feederhouse lift cylinder. The second load sensor may be disposed adjacent to a front end of the second feederhouse lift cylinder.

The first load sensor may be disposed to sense a first load applied to the left side of the agricultural harvester, and the second load sensor may be disposed to sense a second load applied to the right side of the agricultural harvester.

The first load sensor may be disposed to sense the first load at a first position on the left side of the agricultural harvester. The second load sensor may be disposed to sense the second load at a second position on the right side of the agricultural harvester. The first position and the second position may be disposed directly opposite each other and equidistant from a longitudinally and vertically extending plane that passes through the lateral middle of at least one of (a) the agricultural harvester, (b) a harvesting head, and (c) a feederhouse.

In accordance with a second aspect of the invention, of method for controlling a load on an agricultural harvester is provided, the method comprising: a step of automatically and electronically sensing a first load applied to the agricultural harvester; a step of automatically and electronically sensing a second load applied to the agricultural harvester; a step of automatically and electronically determining whether a difference in magnitude between the first load and the second load exceeds a threshold load; and a step of automatically and electronically (a) raising an agricultural harvesting head or (b) stopping over-the-ground movement of the agricultural harvester, when the difference in magnitude between the first load and the second load exceeds the threshold load.

The step of automatically and electronically sensing a first load applied to the agricultural harvester may comprise a step of automatically and electronically sensing the first load at a first location disposed on the left side of the agricultural harvester. The step of automatically and electronically sensing a second load applied to the agricultural harvester may comprise a step of automatically and electronically sensing the second load at a second location disposed on the right side of the agricultural harvester.

The first location and the second location may be disposed directly opposite to each other and equidistant from a longitudinal and vertically extending plane passing through the lateral middle of at least one of (a) the agricultural harvester, (b) a harvesting head, and (c) a feederhouse.

The agricultural harvester may comprise a self-propelled agricultural harvesting vehicle and a feederhouse coupled to and extending forward from the self-propelled agricultural harvesting vehicle. The first load may be measured at a location adjacent to the left side of the feederhouse. The second load may be measured in a location adjacent to the right side of the feederhouse.

The first load may be measured at a location adjacent to the left side of the feederhouse at a forward end of the feederhouse. The second load may be measured at a location adjacent to the right side of the feederhouse at a forward end of the feederhouse.

The first load may be measured at a location adjacent to the left side of the feederhouse at a rear end of the feederhouse. The second load may be measured at a location adjacent to the right side of the feederhouse at a rear end of the feederhouse.

The first load may be measured at a front end of a left side feederhouse lift cylinder. The second load may be measured at a front end of a right side feederhouse lift cylinder.

The first load may be measured at a rear end of a left side feederhouse lift cylinder. The second load may be measured at a rear end of a right side feederhouse lift cylinder.

DETAILED DESCRIPTION

In the discussion below, the terms "front", "forward", "in front of", and variants thereof refer to the forward direction of travel of the vehicle as it travels through the field harvesting crops. This direction of travel is indicated by the letter "V" in FIG. 1.

In the discussion below, the terms "rear", "rearward", "behind", and variants thereof refer to a direction opposite to the forward direction of travel.

In the discussion below, the terms "transverse", "lateral", or "side-to-side" refer to a direction that is generally horizontal and perpendicular to the direction of travel "V".

Figure 1:
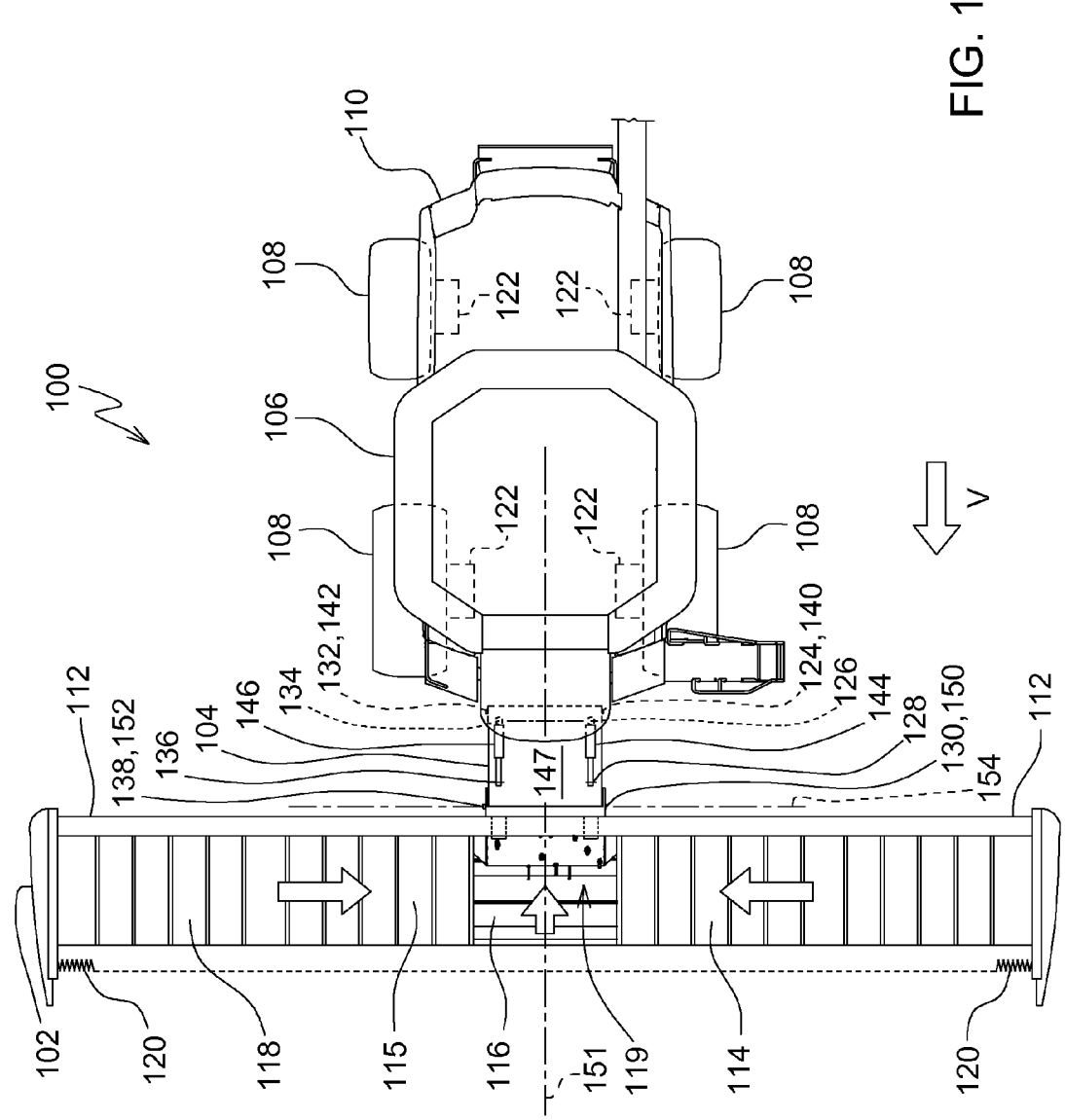
FIG. 1 is a plan view of an agricultural harvester in accordance with the present invention.
Figure 2:
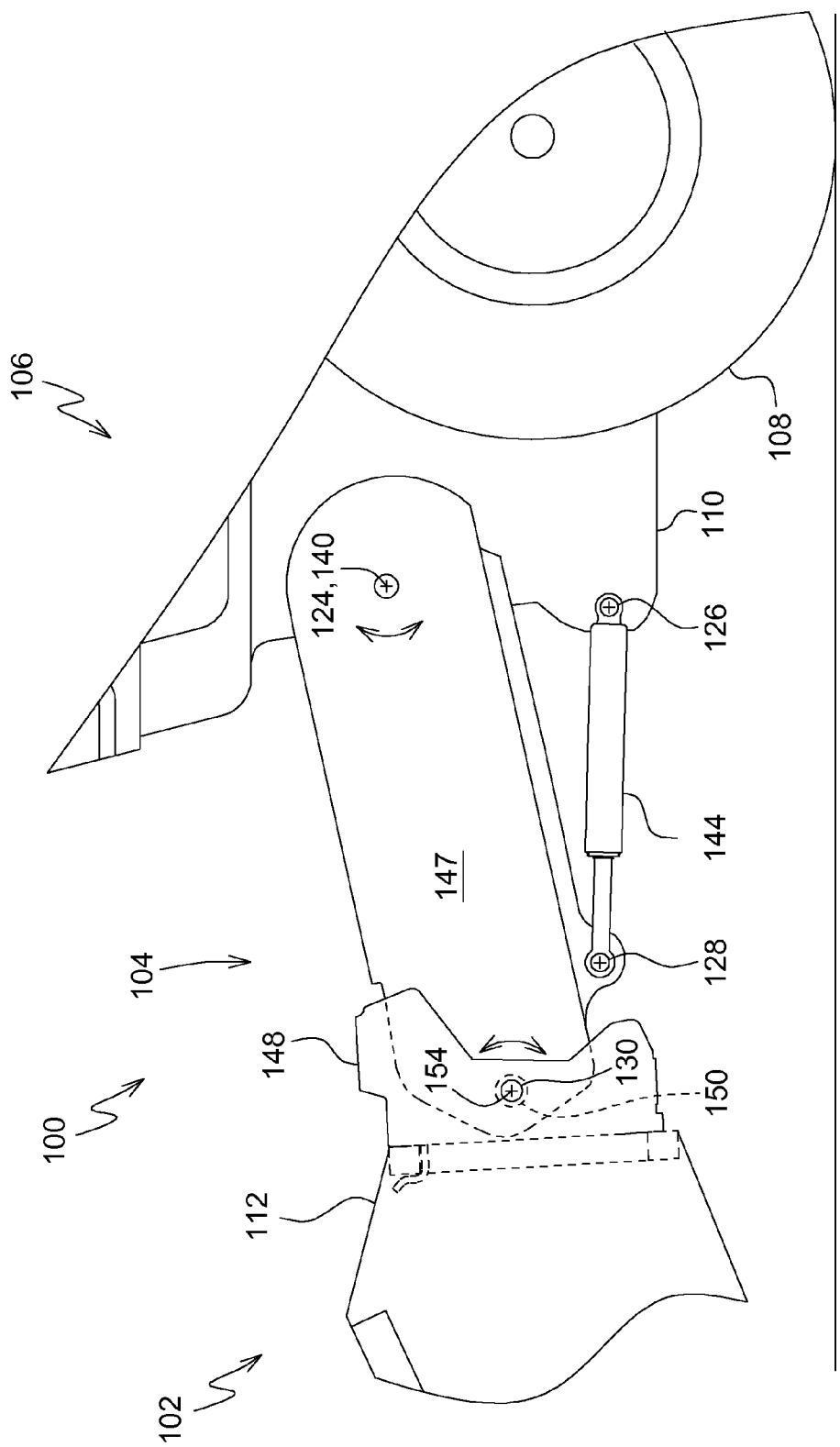
FIG. 2 is a side view of the feederhouse of the agricultural harvester of FIG. 1.

Referring now to FIGS. 1 and 2, an agricultural harvester 100 comprises a harvesting head 102 which is mounted on a feederhouse 104 that is supported on the front of a self-propelled agricultural harvesting vehicle 106.

The self-propelled agricultural harvesting vehicle 106 is supported on four wheels 108 that define a ground-engaging arrangement and support the agricultural harvester 100 for travel over the ground while harvesting crops. The wheels 108 are connected to a frame 110 of the self-propelled agricultural harvesting vehicle 106. The agricultural harvester 100 travels through the field in the direction "V" as it harvests crop.

The harvesting head 102 includes an elongate frame 112 that supports a left side endless belt conveyor 114, a center endless belt conveyor 116, and a right side endless belt conveyor 118. The left side endless belt conveyor 114, the center endless belt conveyor 116, and the right side endless belt conveyor 118 receive crop plants severed from the ground and carry the crop plants in the directions indicated by the arrows superimposed on the conveyors to an aperture 119 located at the rear central portion of the harvesting head 102. An elongate reciprocating knife 120 severs the crop plants from their roots. The elongate reciprocating knife 120 extends in a transverse direction across substantially the entire width of the harvesting head 102.

Each of the four wheels 108 of the self-propelled agricultural harvesting vehicle 106 is driven in rotation by a corresponding hydraulic motor 122. The four wheels 108 support the self-propelled agricultural harvesting vehicle 106 for travel over the ground.

Four load sensors 124, 126, 128, and 130 are located adjacent to the left side of the feederhouse 104. Four load sensors 132, 134, 136, 138 are located adjacent to the right side of the feederhouse 104.

The load sensor 124 and the load sensor 132 are disposed at either side of the feederhouse 104 at a left side feederhouse pivot 140, and at a right side feederhouse pivot 142.

The feederhouse 104 is supported on the front of the self-propelled agricultural harvesting vehicle 106 at the left side feederhouse pivot 140 and the right side feederhouse pivot 142. These pivots constrain the feederhouse 104 to pivot about a laterally extending horizontal pivot axis that is defined by and is coaxial with both the left side feederhouse pivot 140 and the right side feederhouse pivot 142.

The load sensor 124 is disposed to sense the load applied to the self-propelled agricultural harvesting vehicle 106 by the feederhouse 104 at the left side feederhouse pivot 140. The load sensor 132 is disposed to sense the load applied to the self-propelled agricultural harvesting vehicle 106 by the feederhouse 104 at the right side feederhouse pivot 142.

The load sensor 126 is disposed at the left side of the feederhouse 104 to sense the load applied to the self-propelled agricultural harvesting vehicle 106 by the rear (cylinder) end of the left side feederhouse lift cylinder 144. The load sensor 134 is disposed at the right side of the feederhouse 104 to sense the load applied to the self-propelled agricultural harvesting vehicle 106 by the rear (cylinder) end of the right side feederhouse lift cylinder 146.

The rear end of the left side feederhouse lift cylinder 144 is coupled to the self-propelled agricultural harvesting vehicle 106 adjacent to the left side of the feederhouse 104. The rear end of the right side feederhouse lift cylinder 146 is coupled to the self-propelled agricultural harvesting vehicle 106 adjacent to the right side of the feederhouse 104.

The load sensor 128 and the load sensor 136 are disposed at either side of the feederhouse 104 to sense the load applied to the feederhouse 104 by the front end of the left side feederhouse lift cylinder 144 and the front end of the right side feederhouse lift cylinder 146, respectively. The load sensor 128 is disposed adjacent to the front end of the left side feederhouse cylinder 144. The load sensor 136 is disposed adjacent to the front end of the right side feederhouse cylinder 146.

The front end of the left side feederhouse lift cylinder 144 is coupled to a lower portion of the feederhouse 104 (which includes a forward frame 148) on the left side of the feederhouse 104. The front end of the right side feederhouse lift cylinder 146 is coupled to a lower portion of the feederhouse 104 (which includes the forward frame 148) on the right side of the feederhouse 104.

The left side feederhouse lift cylinder 144 and the right side feederhouse lift cylinder 146 are coupled between the feederhouse 104 and the self-propelled agricultural harvesting vehicle 106 to raise and lower the front end of the feederhouse 104 by extending and retracting under computer control, thereby raising and lowering the harvesting head 102 with respect to the ground.

The feederhouse 104 comprises an open-ended generally rectangular boxlike body 147 having a forward end, and the forward frame 148 coupled to the forward end of the boxlike body 147.

The boxlike body 147 encloses a conveyor (not shown) which conveys cut crop material that passes through the forward frame 148 and is received in the forward end 147 of the boxlike body. The conveyor conveys the cut crop material upward and rearward until it exits the feederhouse 104 adjacent to the left side feederhouse pivot 140, and the right side feederhouse pivot 142.

The forward frame 148 is generally rectangular and defines the aperture into which the cut crop material is inserted by the center endless belt conveyor 116.

The forward frame 148 is coupled to the forward end of the boxlike body 147 on the left side and the right side of the boxlike body 147 at a left side pivot 150 and a right side pivot 152, respectively.

The left side pivot 150 and the right side pivot 152 constrain the forward frame 148 to pivot with respect to the forward end of the feederhouse 104 about a horizontal and laterally extending pivot axis 154 that is coaxial with and passes through the left side pivot 150 and the right side pivot 152.

The angle of harvesting head 102 with respect to the ground can be adjusted by pivoting the forward frame 148 with respect to the forward end of the boxlike body 147. The forward frame 148 is configured to support substantially the entire weight of the harvesting head 102 on the forward end of the boxlike body 147.

The load sensor 130 and the load sensor 138 are disposed at either side of the feederhouse 104 at or adjacent to the left side pivot 150 and the right side pivot 152 to sense the load applied by the forward frame 148 to the feederhouse 104 at the left side pivot 150 and the right side pivot 152, respectively.

FIG. 2 is a left side view of the agricultural harvester 100. The agricultural harvester 100 is symmetric about a common longitudinally extending and vertical plane 151 passing which passes through the lateral center of the feederhouse 104, the lateral center of the self-propelled agricultural harvesting vehicle 106, and the lateral center of the harvesting head 102.

Thus, the left side arrangement shown in FIG. 2 is identical to the right side arrangement, but in mirror image form. Thus, the right side load sensors, the right side hydraulic lift cylinder, and the right side pivots and other structures are identical to the left side load sensors, the left side hydraulic the cylinder and the left side pivots. Thus also, each pair of directly opposing left side and right side load sensors are spaced equidistantly away from, but in opposite directions (i.e. one to the left and one to the right) with respect to, a longitudinally and vertically extending center plane of the agricultural harvester 100, of the harvesting head 102, and of the feederhouse 104.

Figure 3:
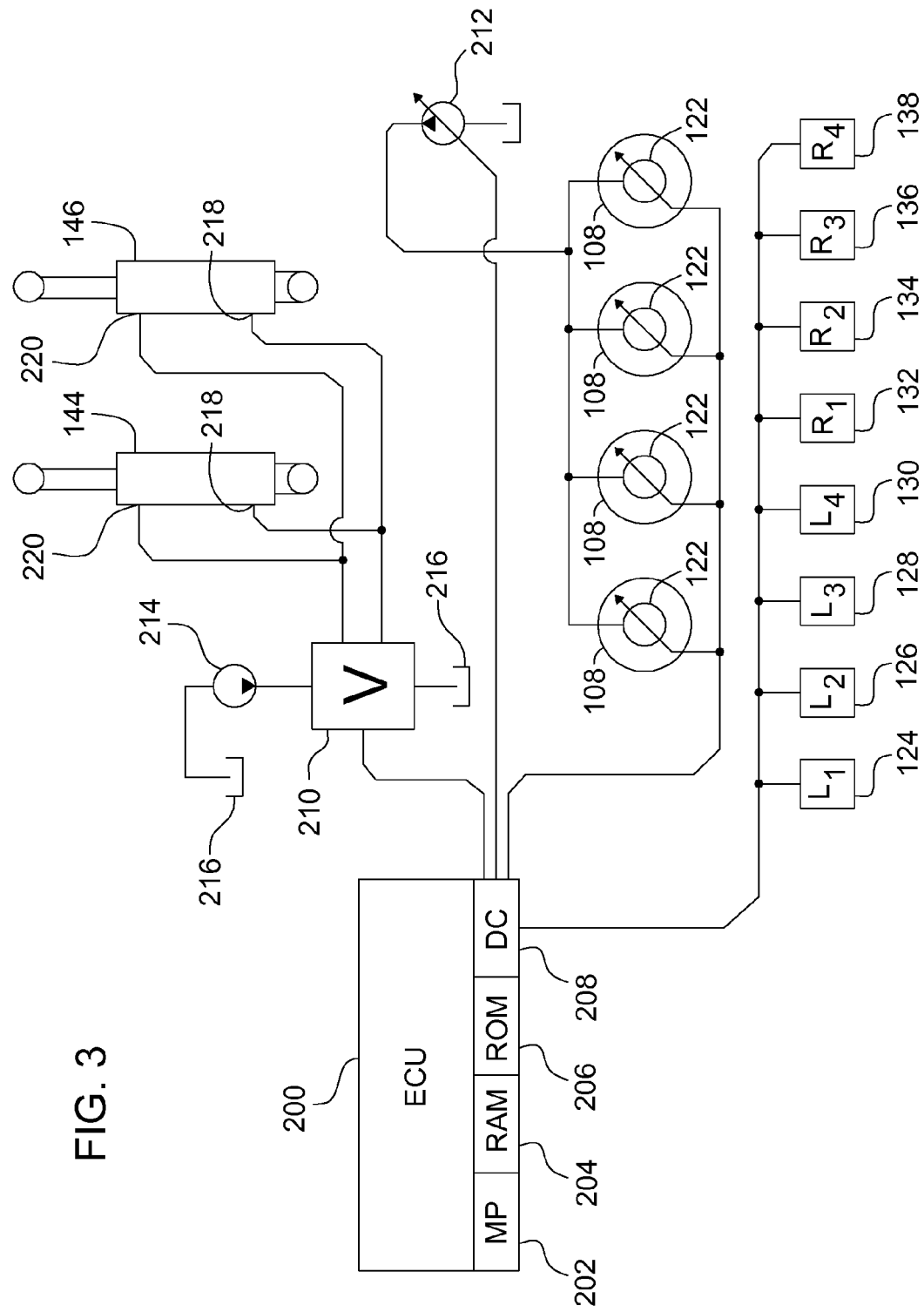
FIG. 3 is a schematic diagram of a hydraulic and electrical control circuit on the agricultural harvester for controlling loads applied to the feederhouse of FIGS. 1 and 2.

Referring to FIG. 3, an electronic control unit (ECU) 200 comprises a microprocessor 202, a random-access memory circuit (RAM) 204, a read-only memory circuit (ROM) 206 and a signal conditioning/driver circuit 208. The microprocessor 202 executes programmed instructions stored in ROM 206. RAM 204 is provided to permit the microprocessor 202 to store calculated values needed for its proper operation. Signal conditioning/driver circuit 208 is provided to permit the ECU 200 receive signals from various sensors and conditional signals for use by the microprocessor 202, and to boost the signal provided by the microprocessor 202 to signal levels sufficient to operate the components controlled by the ECU 200. The ECU 200 is coupled to and receives signals from load sensors 124, 126, 128, 130 disposed at the left side of the feederhouse 104. The ECU 200 is coupled to and receives signals from load sensors 132, 134, 136, 138 disposed at the right side of the feederhouse 104.

The ECU 200 is coupled to and transmits drive signals to hydraulic pump 212 which is a variable displacement pump. The ECU 200 thereby varies the displacement of the hydraulic pump 212 and therefore the hydraulic fluid output of the hydraulic pump 212.

The ECU 200 is coupled to and transmits drive signals to the four hydraulic motors 122 coupled to each of the four wheels 108, respectively. The four hydraulic motors 122 are variable displacement motors. The drive signals applied to the four hydraulic motors 122 vary the displacement of the four hydraulic motors 122.

The hydraulic pump 212 and the four hydraulic motors 122 together define a controllable powered driving arrangement and are coupled together in a hydrostatic drive circuit. The ECU 200 is configured to vary the speed of the self-propelled agricultural harvesting vehicle 106 over the ground by varying the displacement of the hydraulic pump 212 and the displacement of the four hydraulic motors 122.

The ECU 200 is also coupled to and transmits drive signals to hydraulic valve 210. Hydraulic valve 210 is coupled to and receives hydraulic fluid under pressure from hydraulic fluid source 214. Hydraulic valve 210 is coupled to and releases hydraulic fluid to hydraulic fluid reservoir 216. Hydraulic valve 210 selectively transmits hydraulic fluid to the extend ports 218 on left side feederhouse lift cylinder 144 and right side feederhouse lift cylinder 146. Hydraulic valve 210 selectively transmits fluid to retract ports 220 on left side feederhouse lift cylinder 144 and right side feederhouse lift cylinder 146.

The ECU 200 is configured to raise the harvesting head 102 by controlling the hydraulic valve 210 to convey hydraulic fluid under pressure from the hydraulic fluid source 214 to the extend ports 218, and to return hydraulic fluid from the retract ports 220 to the hydraulic fluid reservoir 216.

The ECU 200 is also configured to lower the harvesting head 102 by controlling hydraulic valve 210 to convey hydraulic fluid from the hydraulic fluid source 214 to the retract ports 220 and to return hydraulic fluid from the extend ports 218 to the hydraulic fluid reservoir 216.

Figure 4:
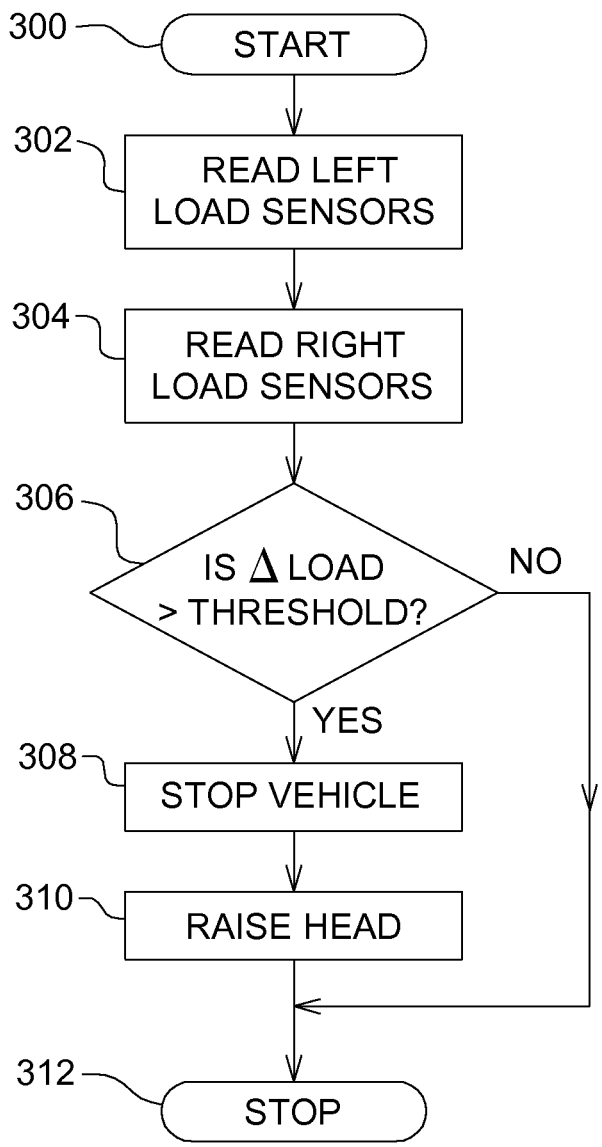
FIG. 4 is a flowchart of the mode of operation of the control circuit of FIG. 3.

FIG. 4 illustrates the operation of the ECU 200 under control of the instructions stored in ROM 206.

The process starts at step 300 and continues to step 302.

In step 302, the ECU 200 reads signals provided by the left load sensors 124, 126, 128, 130.

In step 304, the ECU 200 reads signals provided by the right load sensors 132, 134, 136, 138.

In step 306, the ECU 200 compares the load signal provided by the left load sensors 124, 126, 128, 130 with the load signal provided by the right load sensors 132, 134, 136, 138.

If the ECU determines that the difference in load indicated by the load sensors 124, 126, 128, 130 as compared to the load indicated by the load sensors 132, 134, 136, 138 is higher than a threshold load value stored in the memory circuits of ECU 200, then the ECU 200 proceeds to step 308. In step 308, the ECU 200 transmits a signal to the hydraulic pump 212 and transmits signals to the four hydraulic motors 122 to vary their displacement such that the self-propelled agricultural harvesting vehicle 106 stops its forward motion.

If the ECU 200 determines that the difference in load is less than the threshold, the ECU continues to step 312 and the process terminates.

In step 310, the ECU 200 transmits a signal to hydraulic valve 210 to extend the left side feederhouse lift cylinder 144 and the right side feederhouse lift cylinder 146. When the left side feederhouse lift cylinder 144 and the right side feederhouse lift cylinder 146 are extended, feederhouse 104 rotates clockwise (as shown in FIG. 2) and lifts the front end of the feederhouse 104 higher above the ground. This, in turn, lifts the forward frame 148, which in turn lifts the harvesting head 102.

After step 310 is executed, the ECU 200 continues to step 312 and terminates.

The process of FIG. 4 is programmed to repeat frequently at regular intervals as the self-propelled agricultural harvesting vehicle 106 travels through the field harvesting crop. Typically, the process of FIG. 4 is scheduled to be performed every 5 to 40 milliseconds.

In the description above, four load sensors are provided on the left side of the feederhouse 104 and four load sensors are provided on the right side of the feederhouse 104.

In another arrangement, one of the load sensors on the left side and one of the load sensors on the right side are read by the ECU 200 and are used in the process of FIG. 4. The load sensor 124 and the load sensor 132 are used in this arrangement. Alternatively the load sensor 126 and the load sensor 134 are used in this arrangement. Alternatively the load sensor 128 and the load sensor 136 are used in this arrangement. Alternatively the load sensor 130 and the load sensor 138 are used in this arrangement.

In another arrangement two of the load sensors on the left side and two of the load sensors on the right side are read by the ECU 200 and are used in the process of FIG. 4.

In another arrangement three of the load sensors on the left side and three of the load sensors on the right side are read by the ECU 200 and are used in the process of FIG. 4.

The advantage of any of the foregoing arrangements is that the system can quickly detect an asymmetrical load on the harvesting head 102 caused by one side or the other side of the harvesting head 102 contacting the ground. When one side of the harvesting head 102 contacts the ground, this appears as a rapidly growing asymmetric load on one side of the feederhouse 104 versus the other side of the feederhouse 104. The load can be relatively small, but because it is asymmetric (as determined by taking a difference of the signals on the left side and the signals on the right side) it indicates even slight torsional loads that could twist the harvesting head 102 clockwise or counterclockwise (as shown in FIG. 1) with respect to the self-propelled agricultural harvesting vehicle 106. It is these torsional or twisting loads that pose a significant problem for the agricultural harvester 100 as opposed to an even load exerted rearward across the entire width of the harvesting head 102. The torsional or twisting loads caused by any impact with the ground or other solid object can cause immediate and significant damage to the harvesting head 102 or the feederhouse 104. For this reason, it is important to distinguish between the magnitude of a load, generally, on the feederhouse 104, and the magnitude of the torsional component of a load on the feederhouse 104.

The arrangement described herein permits the ECU 200 to immediately identify a torsional load before it becomes too great, and to reduce that load, either by stopping the combine harvester, or by lifting the harvesting head 102 when this load is sensed. In either case, if it is contact with the ground that is causing the torsional load on the feederhouse 104 to rise suddenly, the stopping of the combine harvester, and the lifting of the harvesting head 102 will mitigate or prevent any such damage due to torsional loads.

In another arrangement, either step 308 (stopping the self-propelled agricultural harvesting vehicle 106) or step 310 (raising the harvesting head 102) can be performed. Both steps need not be performed in order to provide the benefits of reducing damage to the feederhouse 104.

The description and figures herein are provided to illustrate at least one concrete example of how the invention can be practiced. The invention itself, however, is not limited to being practiced in the particular way always described herein. The claims (below) define the invention and encompass more than the specific examples provided herein.

For example, the description above of the schematic diagram attached hereto describes an ECU 200. The ECU 200 may be a single ECU 200, or it may be two or more ECUs 200 connected over a communications network. A single ECU 200 may perform all of the functions described herein, or a plurality of ECUs 200 may each selectively perform a portion of the functions described herein.

We claim:

1. In an agricultural combine harvester (100) supported on a ground engaging arrangement (108) for over-the-ground travel in a forward direction during harvesting operation and including a forwardly extending feederhouse (104) mounted to a frame (110) of the harvester (100) by right and left pivots (140) and (142), respectively, for pivoting vertically about a first, horizontal transverse axis and a harvesting head (102) mounted at a forward end of the feederhouse (104) for pivoting vertically about a second, horizontal transverse axis (154), a system for controlling a load imposed on the feederhouse (104) due to the harvesting head (102) colliding with the ground, comprising:

a first load sensor (124, 126, 128, 130) disposed to sense a first load applied to a left side of the feederhouse (104);

a second load sensor (132, 134, 136, 138) disposed to sense a second load applied to a right side of the feederhouse (104);

a controllable powered driving arrangement (122, 212) coupled to said ground-engaging arrangement (108) for selectively controlling a ground speed of the around-engaging arrangement (108);

a controllable, powered lifting arrangement (144, 146, 210, 214, 216) connected between the frame (110) of the harvester (100) and the feederhouse (104) for selectively effecting vertical movement of the feederhouse (104) about said first horizontal transverse axis;

an electronic control unit (200) coupled to the first load sensor (124, 126, 128, 130) and the second load sensor (132, 134, 136, 138), wherein the electronic control unit (200) is configured to (a) read a first load signal from the first load sensor, (b) read a second load signal from the second load sensor, (c) determine whether a difference of the first load and the second load exceeds a threshold load, and (d) if the difference exceeds the threshold load, to control one of said powered lifting arrangement to lift the harvesting head (102) and said powered driving arrangement (122, 212) to stop over-the-ground travel of the agricultural harvester (100).

2. The agricultural combine harvester (100) of claim 1, wherein the first load sensor (124) is disposed adjacent to the first pivot (140), and the second load sensor is disposed adjacent to the second pivot (142).

3. The agricultural combine harvester (100) of claim 1, wherein the agricultural harvester (100) further comprises a frame (148) wherein the frame (148) is pivotally coupled to the front of the feederhouse at a third pivot (150) and a fourth pivot (152), which are located along said second horizontal transverse axis (154), and further wherein the frame (148) is configured to support and supports the harvesting head (102).

4. The agricultural combine harvester (100) of claim 3, wherein the first load sensor (130) is disposed adjacent to the third pivot (150) and the second load sensor (138) is disposed adjacent to the fourth pivot (152).

5. The agricultural combine harvester (100) of claim 1, wherein the powered lifting arrangement) comprises a first feederhouse lift cylinder (144) and a second feederhouse lift cylinder (146), wherein the first feederhouse lift cylinder (144) and the second feederhouse lift cylinder (146) are configured to move a forward end of the feederhouse vertically, and further wherein a rear end of the first feederhouse lift cylinder (144) is coupled to the frame (110) of the self-propelled agricultural harvesting vehicle (106) at a third pivot, and a rear end of the second feederhouse lift cylinder (146) is coupled to the frame (110) of the self-propelled agricultural harvesting vehicle (106) at a fourth pivot.

6. The agricultural combine harvester (100) of claim 5, wherein the first load sensor (126) is disposed adjacent to the third pivot, and the second load sensor (134) is disposed adjacent to the fourth pivot.

7. The agricultural combine harvester (100) of claim 5, wherein the first feederhouse lift cylinder (144) has a front end pivotally coupled to a first front end location of the feederhouse and the second feederhouse lift cylinder (146) has a front end pivotally coupled to a second front end location of the feederhouse, and wherein the first load sensor (128) is disposed adjacent to a front end of the first feederhouse lift cylinder (144), and wherein the second load sensor (136) is disposed adjacent to a front end of the second feederhouse lift cylinder (146).

8. The agricultural combine harvester (100) of claim 1, wherein the first load sensor (124, 126, 128, 130) is disposed to sense the first load at a first position on the left side of the agricultural harvester (100), and wherein the second load sensor (132, 134, 136, 138, is disposed to sense the second load at a second position on the right side of the agricultural harvester, and further wherein the first position and the second position are disposed directly opposite each other and equidistant from a longitudinally and vertically extending plane that passes through the lateral middle of the feederhouse (104).

9. A method for controlling a load on a feederhouse of an agricultural harvester (100) comprising:
- a step of automatically and electronically sensing a first load transmitted to a first location at a left side of the feederhouse of the agricultural harvester by a harvesting head (102) of the agricultural harvester;
- a step of automatically and electronically sensing a second load transmitted to a second location at a right side of the feederhouse of the agricultural harvester by the harvesting head (102) of the agricultural harvester;
- a step of automatically and electronically determining whether a difference in magnitude between the first load and the second load exceeds a threshold load;
- a step of automatically and electronically performing one of (a) raising an agricultural harvesting head (102) and (b) stopping over-the-ground movement of the agricultural harvester (100), when the difference in magnitude between the first load and the second load exceeds the threshold load.

10. The method of claim 9, wherein the first location and the second location are disposed directly opposite to each other, and equidistant from a longitudinal and vertically extending plane passing through the lateral middle of at least one of the feederhouse (104).

11. The method of claim 9, wherein the first load is location is at a forward end of the feederhouse (104), and wherein the second location is at a forward end of the feederhouse (104).

12. The method of claim 9, wherein the first location is at a rear end of the feederhouse (104), and wherein the second location is at a rear end of the feederhouse (104).

13. The method of claim 9, wherein the first load is measured at a front end of a left side feederhouse lift cylinder (144), and wherein the second load is measured at a front end of a right side feederhouse lift cylinder (146).

14. The method of claim 9, wherein the first load is measured at a rear end of a left side feederhouse lift cylinder (144) and wherein the second load is measured at a rear end of a right side feederhouse lift cylinder (146).

* * * * *